United States Patent [19]
Gargiulo

[11] Patent Number: 5,372,388
[45] Date of Patent: Dec. 13, 1994

[54] INTEGRAL MULTI-DUCT CONDUIT SECTION

[75] Inventor: Joseph L. Gargiulo, Colts Neck, N.J.

[73] Assignee: American Pipe & Plastics, Inc., Binghamton, N.Y.

[21] Appl. No.: 56,290

[22] Filed: Apr. 30, 1993

[51] Int. Cl.5 ............................................. F10L 55/00
[52] U.S. Cl. ...................................... 285/24; 285/27; 285/110; 285/137.1
[58] Field of Search .................. 285/137.1, 24, 25, 26, 285/27, 28, 29, 110

[56] References Cited

U.S. PATENT DOCUMENTS

| | | |
|---|---|---|
| 268,031 | 11/1882 | Linford . |
| 273,395 | 3/1883 | Plankinton . |
| 528,291 | 10/1894 | Cummings . |
| 680,151 | 8/1901 | Hultman . |
| 2,696,835 | 12/1954 | Kaiser . |
| 3,042,427 | 7/1962 | Word . |
| 3,125,361 | 2/1965 | Weaver . |
| 3,574,356 | 4/1971 | Salerno . |
| 3,590,855 | 7/1971 | Woollen et al. ............. 285/137.1 X |
| 3,747,632 | 7/1973 | Kok . |
| 3,998,477 | 12/1976 | Delahaye et al. ............. 285/110 X |
| 4,148,495 | 4/1979 | van Zon ........................ 285/137.1 X |
| 4,341,392 | 7/1982 | van Dongeren . |
| 4,865,354 | 12/1989 | Allen ............................. 285/137.1 X |
| 5,078,432 | 1/1992 | Seiter . |
| 5,135,265 | 8/1992 | Bouscher et al. ............. 285/137.1 |
| 5,137,306 | 8/1992 | Flood ............................ 285/137.1 |
| 5,236,227 | 8/1993 | Adams et al. ................. 285/137.1 X |

FOREIGN PATENT DOCUMENTS

| | | | |
|---|---|---|---|
| 0307780 | 3/1989 | European Pat. Off. ......... 285/137.1 |
| 1398064 | 3/1965 | France ............................ 285/137.1 |
| 2845926 | 4/1980 | Germany . |
| 0798470 | 7/1958 | United Kingdom ............. 255/137.1 |
| 1164335 | 9/1969 | United Kingdom ............. 285/137.1 |
| 1220249 | 1/1971 | United Kingdom ............. 285/137.1 |
| 2068490 | 8/1981 | United Kingdom ............. 285/137.1 |

*Primary Examiner*—Randolph A. Reese
*Assistant Examiner*—Heather Chun Shackelford
*Attorney, Agent, or Firm*—Cumpston & Shaw

[57] ABSTRACT

An integral conduit section of a multiple conduit system includes an outer housing having a straight coupling portion at one end and a belled coupling portion at the other end, a plurality of innerducts disposed in a parallel manner within the outer housing, one or more spacers for parallely positioning said innerducts in the outer housing, and a three-piece innerduct coupler disposed within the belled portion of the outer housing and engaged with the trailing ends of a plurality of innerducts, being linearly interconnectable with like conduit sections. The innerduct coupler includes a guide for facilitating entry of the plurality of innerducts of an adjacent conduit section into a like section; a seal that creates an air and water tight seal between the adjacent innerducts when like sections are interconnected, without the need for cement or sealing lubricants; and a seating component that terminally positions the innerducts in the innerduct coupler upon the interconnection of like integral conduit sections.

25 Claims, 4 Drawing Sheets

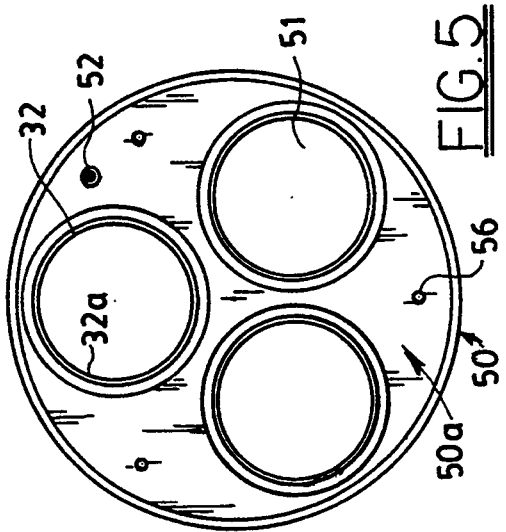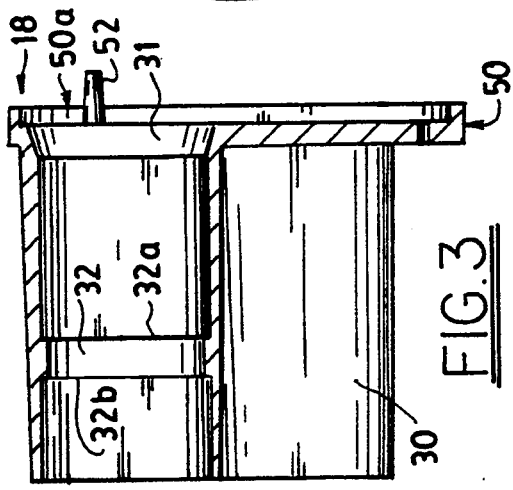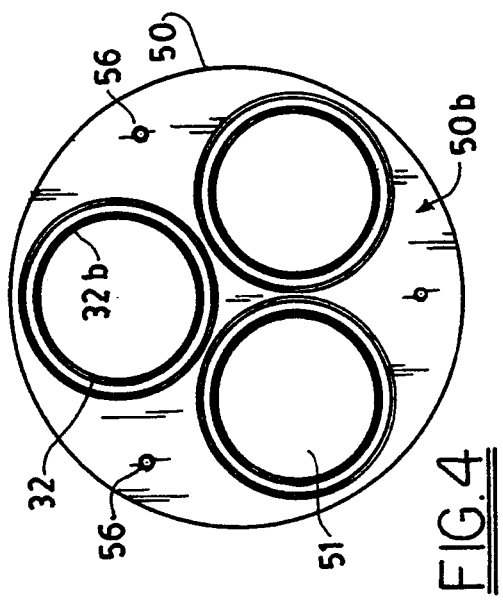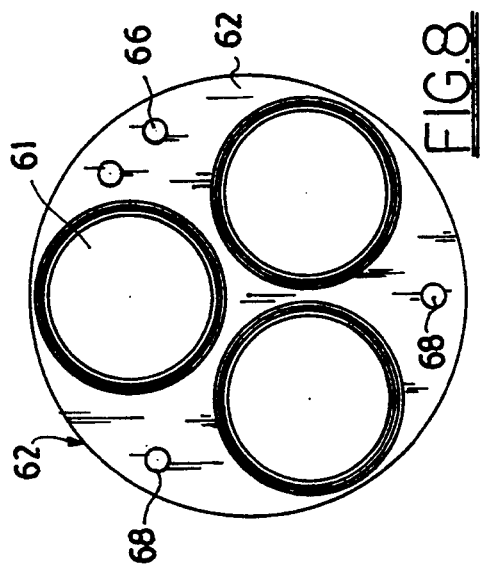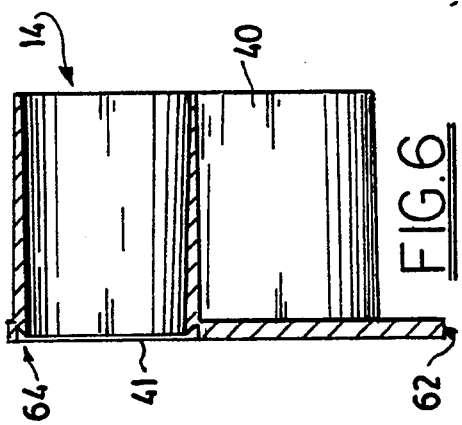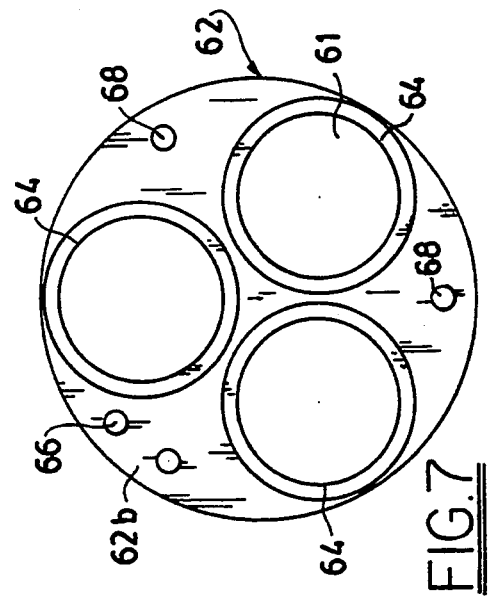

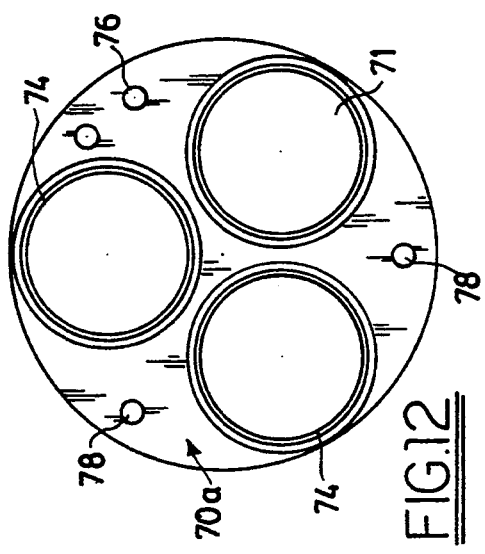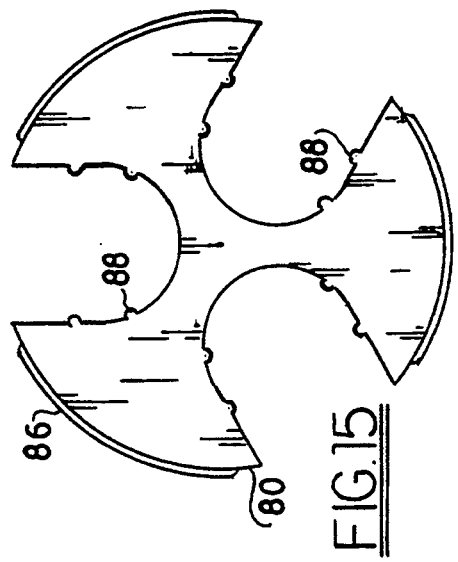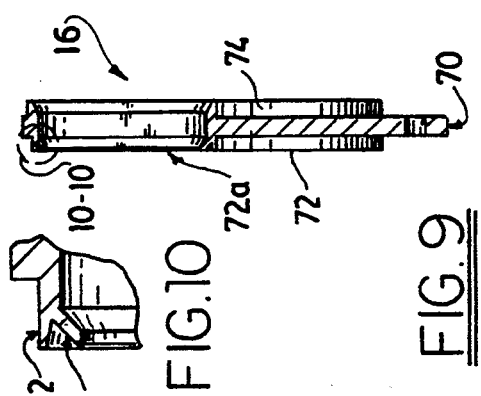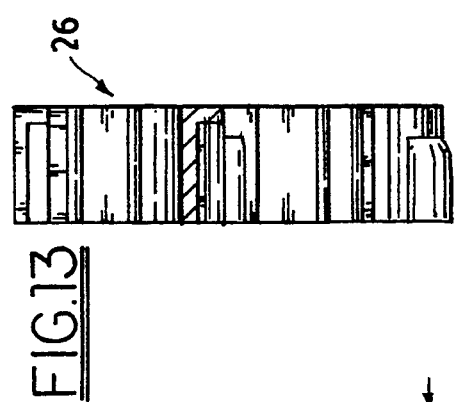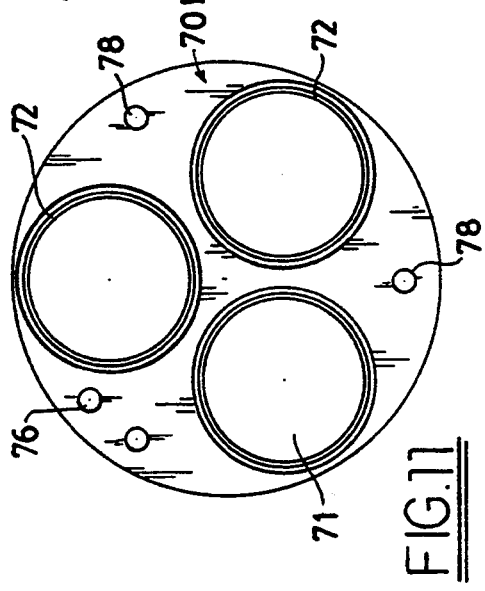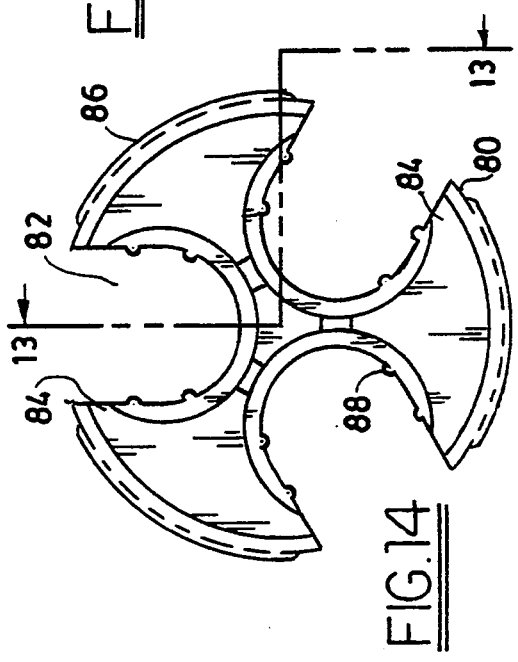

INTEGRAL MULTI-DUCT CONDUIT SECTION

FIELD OF THE INVENTION

This invention relates generally to conduit systems for underground fiber optic cable installation which comprise conduit sections having a plurality of innerducts disposed within an outer housing, and means for connecting similar conduit sections end-to-end. Specifically, the invention relates to an integral conduit section having an outer housing with a straight coupling portion at one end and a belled coupling portion at another end for receiving the straight portion of an adjacent section, and an innerduct coupler disposed within the outer housing that sealably engages all of the innerducts of the adjacent conduit section at the same time without the need for cement or sealing lubricants.

BACKGROUND OF THE INVENTION

Data is increasingly transmitted via fiber optic cables. Conduit systems are used to facilitate the underground installation of fiber optic cable networks. Typically, a conduit section includes a plurality of innerducts housed in an outer duct, and each section is connected end-to-end with a like section to form a continuous conduit network. The conduit sections are preferably joined together at the installation site therefore it is highly desirable to be able to interconnect them in one efficient and reliable operation.

It is also important to achieve an air and water tight seal between the adjacent innerducts when conduit sections are interconnected. A water fight seal reduces data transmission problems, while an air fight conduit network increases the uninterrupted distance over which conventional fiber optic cable threading procedures can be carried out.

Seiter, U.S. Pat. No. 5,078,432, describes a system employing multiple duct conduit sections and separate couplers to connect adjacent sections. The outer couplers have a double-ended belled housing to connect adjacent sections together, while an inner coupler is used for connecting the inner ducts of adjacent sections. The inner coupling described in the Seiter patent comprises a one-piece receptacle including a flange with a plurality of cylindrical sockets extending in both directions for receiving the inner ducts, and O-rings seated in grooves therein for forming a seal around the inner ducts of an abutting conduit section when the inner ducts are pushed through. The annular seal means, or O-rings, must be individually mounted within the receptacle and may dislodge when an inner duct is pushed through thus compromising the integrity of the conduit system; while it requires increased time and expense to perform the assembly of the conduit system which involves separate coupling members.

SUMMARY OF THE INVENTION

The present invention describes an integral conduit section that can be directly connected to a like, adjacent, conduit section for forming a reliable air and water fight seal between a plurality of innerducts without the need for sealing lubricants or cement. The integral conduit section includes an outer housing having a first, straight, coupling portion at one end and a second, belled, coupling portion at the other end; a three-piece inner coupler disposed within said belled end; one or more inner duct spacers; and a plurality of innerducts disposed in the outer housing in a mutually parallel manner. The leading end of each inner duct is chamfered and extends past the open end of the straight portion of the outer housing. These exposed innerducts become the leading end of an adjacent, like integral conduit section that connects with the belled coupling portion of a preceding conduit section. The straight coupling portion of the adjacent outer housing is telescopically received in the preceding outer housing belled portion while, at the same time, file plurality of adjacent innerducts are sealably engaged by the innerduct coupler which extends up to the orifice of the belled portion for facilitating the alignment and entry of said adjacent innerducts.

The inner coupler includes a seating component, a guide component, and a seal, which are fastened together by conventional means. The seating component comprises a circular flange having a plurality of short, open ended, parallel tubes depending from the flange. The inner diameter of each tube is just large enough to telescopically receive an innerduct. Each tube contains an internal seating collar having a radial thickness approximately equal to the wall thickness of the innerducts, located intermediate its ends, and against one side of which the trailing ends of the innerducts of the conduit section abut and against the other side of which the chamfered, leading ends of the adjacent innerducts abut upon interconnection of like conduit sections. The collar thickness makes for a uniform surface between the colinear innerducts of interconnected conduit sections.

The guide component includes a circular flange having a plurality of open-ended, parallel guide tubes depending from the flange. The guide tubes project in a direction opposite to the seating component tubes. The inner diameter of each tube extends partly through the flange thus forming an annular recess in the sealing surface of the flange around each said tube diameter. Upon assembly of the innerduct coupler, the guide tubes extend from the flange up to the orifice of the belled portion of the outer housing. The guide tubes, thus located immediately within the belled end of the outer housing, telescopically engage the projecting, chamfered ends of the adjacent innerducts upon interconnection of two like conduit sections.

The sealing is a disc shaped flange having a plurality of circular sealing apertures which are each collinear with a guide and a seating component tube. The seal is positioned between the sealing surfaces of the guide and seating flanges upon assembly of the innerduct coupler. Positioning collars encircle each of the sealing apertures on a second sealing surface of the flange adjacent the guide component and engage the annular recesses in the sealing surface of the guide component to orient the sealing apertures in the inner coupler. Sealing collars project from a first sealing surface of the seal flange adjacent the seating component. The sealing collars encircle each aperture and a thin, deformable lip projecting diametrally inward, the inner diameter of which is smaller than the diameter of the sealing apertures. The sealing collar lips deform when an innerduct is pushed there through, and conform to the surface of the innerduct to create an air and water tight seal thereabout.

Upon assembly of the inner coupler, the trailing end of an innerduct is inserted into each scaring component tube until it abuts the seating collar located therein, and is cemented in place. The inner coupler and its projecting innerducts is inserted into the outer housing through the belled portion of said outer housing until the seating component flange seats in the neck of the outer housing, where it is cemented in place. The inner coupler guide tubes extend up to the belled orifice of the outer housing while, at the other end of the outer housing, the chamfered leading ends of the innerducts project past the straight end of the duct for a short distance. This integral conduit section is connectable to a like conduit section by inserting the projecting innerducts of an adjacent conduit section into the guide tubes of a preceding conduit section, through the sealing apertures whereupon the deformable lip sections create an air and water tight seal around each innerduct, and into the seating component tubes until said chamfered ends abut the other side of said seating collar. The straight coupling portion of the outer housing of the adjacent conduit section is simultaneously telescopically engaged within the belled coupling portion of the preceding conduit section to complete the end-to-end connection of like sections.

It is therefore an object of this invention to provide an integral conduit section including a plurality of innerducts housed in an outer housing that is interconnectable to a like conduit section for increasing the distance of uninterrupted fiber optic cable installation.

It is another object of this invention to provide an integral conduit section that requires no sealing lubricants or cement for connection, in end to end alignment, with like conduit sections, and provides an air and water tight seal around abutting innerducts upon interconnection.

It is a further object of this invention to provide an integral conduit section that is used to conveniently, efficiently, and reliably interconnect multiple underground conduit sections at the conduit installation site.

BRIEF DESCRIPTION OF THE DRAWINGS

FIG. 3 is a side view partly in section of the seating component of the inner coupler showing the alignment pin projecting from the inner flange surface.

FIG. 4 is a rear view of the seating component of the inner coupler showing the tube apertures and the seating collars located therein.

FIG. 5 is a front view of the seating component of the inner coupler showing the flange surface including the tube apertures, the seating collars located therein, and the alignment pin.

FIG. 6 is a side view partly in section of the guide component of the inner coupler.

FIG. 7 is a front view of the guide component of the inner coupler showing the tube apertures, annular recessed for the sealing component positioning collars, and the alignment pin aperture.

FIG. 8 is a rear view of the guide component of the inner coupler showing the guide tube apertures and the alignment pin aperture.

FIG. 9 is a side view partly in section of the sealing component of the inner coupler.

FIG. 10 is a detailed view of section 10—10 of FIG. 9 showing the deformable sealing collar.

FIG. 11 is a front view of the sealing component of the inner coupler showing the sealing apertures and sealing collars, and an alignment pin aperture.

FIG. 12 is a rear view of the sealing component of the inner coupler showing the sealing apertures, the positioning collars, and the alignment pin aperture.

FIG. 13 is a side view partly in section of the spacer.

FIG. 14 is a front view of a three conduit spacer.

FIG. 15 is a rear view of a three conduit spacer.

DETAILED DESCRIPTION

Figure 1:
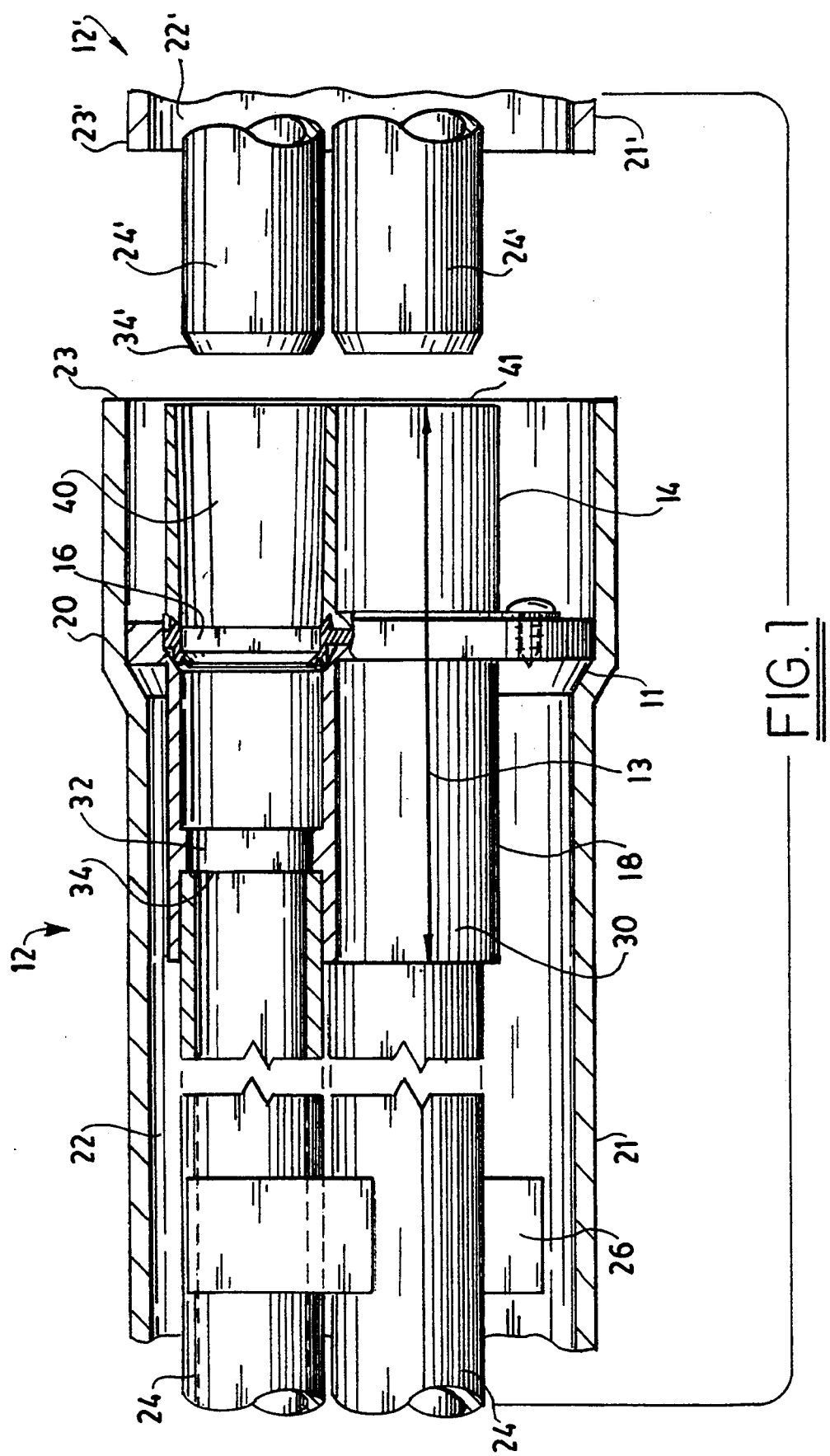
FIG. 1 is a side view partly in section of the conduit section showing the inner coupler seated in the belled end of an outer housing and awaiting insertion of an abutting conduit section having multiple innerducts.

With reference to the drawings, in which like reference numerals indicate like parts throughout the different views, FIG. 1 shows the integral conduit section 12 of the invention comprising an outer housing 22 having a first, straight coupling portion 21 and a second, belled coupling portion 20; an innerduct coupler 13 including guide component 14, a seal 16, and a seating component 18; a plurality of innerducts 24; and spacer 26. The leading end of an adjacent, like conduit section 12' is shown with chamfered ends 34' of adjacent innerducts 24' projecting past the straight end orifice 21' of the adjacent outer housing 22' for a short distance. Inner coupler 13 is seated in the neck portion 11 of outer housing 22 where belled portion 20 narrows to become straight portion 21. The innerducts 24 project past the straight portion orifice of outer housing 22 for a short distance. Spacer 26 is disposed and frictionally positioned within straight portion 21 to maintain innerducts 24 in a mutually parallel relationship.

The three components of inner coupler 13 are illustrated in detail in FIGS. 3–12. Specifically, seating component 18, shown in FIGS. 3, 4 and 5, includes a flange 50 having a sealing surface 50a that contains a plurality of apertures 51 and a plurality of mutually parallel seating tubes 30 projecting from the flange; an alignment pin 52 depending from surface 50a for colinear registration of the inner coupler components; and screw holes 56 for assembly of the inner coupler. Tubes 30 each contain a seating collar 32 intermediate their open ends that projects radially inwardly within each tube. Collar 32 has one side 32a and another side 32b which act as abutting surfaces for innerduct leading ends 34' and trailing ends 34, respectively. The inner diameter of each tube 30 and each aperture 51 are slightly larger than the outer diameter of innerducts 24, while seating collar 32 is smaller than said inner duct diameter by the wall thickness of innerducts 24. The end of each seating tube 30 flares out at 31 where it intersects the sealing surface 50a to ease entry of the adjacent innerducts.

FIGS. 6, 7 and 8 show guide component 14 which includes flange 62 having a sealing surface 62b and a plurality of guide tubes 40 projecting in a parallel manner from the flange. An alignment aperture 66 and screw holes 68 are coaxial with alignment pin 52 and screw holes 56, respectively, of seating component 18. The inner diametral surface 41 of each tube 40 extends into flange 62 whereupon a plurality of annular recesses 64 are formed in sealing surface 62b around each inner diametral surface. The purpose of recesses 64 is to orient the seal between the seating and guide components upon assembly of the inner coupler and will become more apparent in the description of the seal below.

The seal 16 of inner coupler 13, shown in FIGS. 9–12, includes a disk portion 70 having first sealing surface 70a and second sealing surface 70b; a plurality of sealing apertures 71; and alignment and assembly holes 76, 78, respectively. Furthermore, a plurality of annular positioning collars 74 depend from surface 70a. Each positioning collar encircles the perimeter of sealing apertures 71. Seal 16 is positioned between seating component 18 and guide component 14 to form the inner coupler 13, whereupon sealing surface 70a interfaces guide component sealing surface 62b and sealing surface 70b interfaces seating component sealing surface 50a. Each positioning collar 74 is flared at its distant end so that it flushly engages a recess 64 in guide component sealing surface 62b that surrounds each aperture 61, to both prevent the angular displacement of the sealing component when the inner coupler is assembled and to provide a continuous surface within the inner coupler.

A plurality of sealing collars 72 depend from sealing surface 70b. Each sealing collar encircles a sealing aperture 71 on sealing surface 70b and, further, each sealing collar includes an inwardly radially depending annular lip section 72a. The lip sections 72a have an inner diameter that is slightly less than the outer diameters of both the sealing apertures 71 and the innerducts 24. The lip sections 72a are deformable and thus when an innerduct is pushed through a sealing aperture the lip section deforms to conform to the innerduct surface, forming a seal thereabout without the need for cement or sealing lubricants. The deformation of lip sections 72a upon engagement with an innerduct further urges the sealing collar 72 against the inner tapered surface 31 of seating component 18 to seal adjacent innerducts against air and water when like conduit sections are interconnected. FIG. 10 is an enlarged cross-sectional view of fragment 10—10 of FIG. 9 showing the relationship between the collar section 72 and the annular deformable lip section 72a.

In a preferred embodiment of the conduit section of the invention, sealing component 16 is injection molded from a polyethylene resin manufactured by E. I. DuPont de Nemours and Co. under the trademark ALATHON®. It should be understood, however, that other oil resistant compositions suitable for injection molding, which are pliant and capable of forming a seal, can also be used.

The inner coupler is assembled by aligning alignment pin 52 with alignment holes 68, 76, sandwiching the seal 70 between sealing surfaces 50a and 62b, respectively, of the seating and guide components, and fastening the components together with screws through the flanges.

The spacer 26 of the integral conduit section of the invention is shown in FIGS. 13, 14 and 15. The spacer 26 is a disk having a perimeter 80 that is interrupted by a plurality of U-shaped slots, or inner duct passageways, 82, for holding the innerducts 24 in mutual parallel relationship. Each passageway 82 includes one or more gripping ridges 88 that run laterally across each passageway and which cause the inner diametral portion of each passageway to be slightly smaller than each innerduct diameter so that the innerduct is held snugly in each passageway. Spacer 26 also includes one or more tapered ridges 86 located on each perimeter section 80. Tapered ridges 86 insure a snug fit between the spacer 26 and the inner surface of outer conduit 22.

Figure 2:
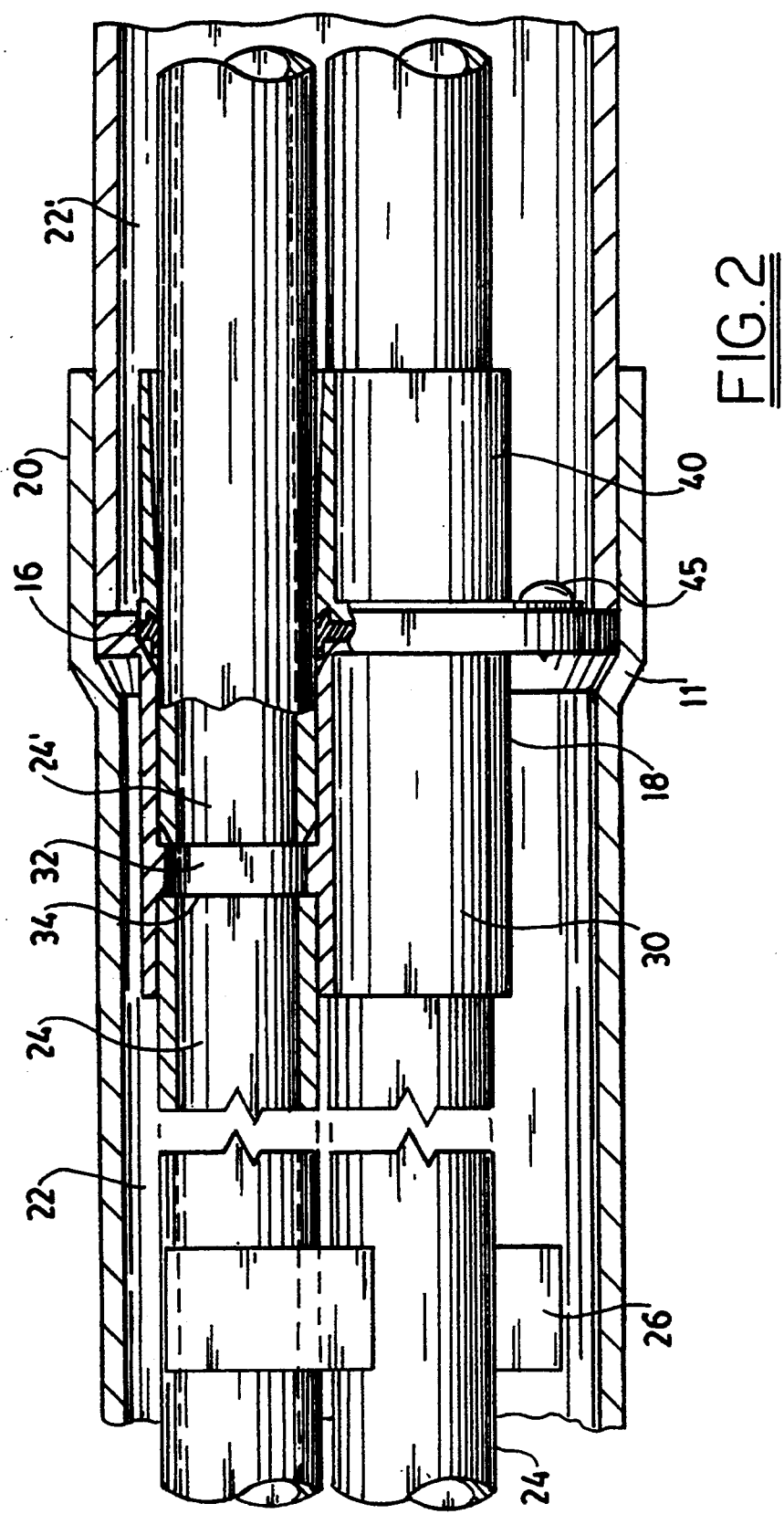
FIG. 2 is a side view partly in section of the conduit section showing an abutting conduit section coupled thereto.

Each integral conduit section 12 of the invention is assembled by cementing a plurality of parallely maintained innerducts 24 into seating tubes 30 of the inner coupler 13 such that the trailing end 34 of each innerduct abuts side 32b of seating collar 32. Spacers 26 maintain the innerducts in mutual parallel relationship. With reference to FIG. 1, inner coupler 13 with spaced, projecting innerducts 24, is next inserted, innerduct end first, into outer housing 22 through open belled end 20 until the flange 50 of inner coupler 13 seats against neck 11 of the outer housing, where it is cemented in place. Spacer 26 is frictionally disposed within the straight portion 21 of outer housing 22. The leading and trailing ends 23', 23, respectively, of conduit section 12, appear as shown, with guide tubes 40 extending up to the open end of belled portion 20, and the leading end of innerducts 24' extending for a short distance past the end of straight portion 21'. FIG. 2 shows two conduit sections 12, 12' interconnected according to the invention whereby the belled end 20 of conduit section 12 telescopically receives the straight end 21' of adjacent conduit section 12' while the plurality of innerducts 24' are simultaneously inserted into guide tubes 40, and through sealing apertures 71, until chamfered ends 34' abut side 32a of seating collar 32. When each inner duct 24' is pushed through a respective sealing aperture 71, the deformable lip sections 72a of sealing collars 72 create an air and water tight seal around and between each adjacent innerduct.

Although the integral conduit section is described and shown herein having three innerducts, it is to be understood that the same principles and details as described will accommodate any number of innerducts. It should also be understood that the embodiment of the invention as disclosed herein is merely illustrative of the preferred embodiment of the invention, and modifications, additions, and deletions may be made thereto without departure from the scope of the invention as set forth in the following claims.

What is claimed is:

1. In an improved multiple duct conduit system including a plurality of linearly interconnectable, integral conduit sections wherein each integral conduit section includes an outer housing and a plurality of inner ducts disposed in parallel relation within the outer housing, the improvement comprising:
 (a) a first portion of the outer housing having a straight end;
 (b) a second portion of the outer housing having a belled end;
 (c) an inner duct coupler disposed within the outer housing, the inner duct comprising:
  (1) a guide component including a flange having a sealing surface and at least one guide tube projecting from the flange the guide tube having an inner diametral surface having an annular recess adjacent the sealing surface;
  (2) a seating component including a flange having a sealing surface and at least one seating tube projecting from the flange for receiving a trailing end of a corresponding inner duct for forming a fluid tight engagement thereto; and
  (3) a seal having a sealing disk portion including a first and a second sealing surface for forming a fluid tight seal with the seating component sealing surface and guide component sealing surface, at least one sealing aperture for slidably receiving a leading end of a corresponding inner duct therethrough, and a corresponding sealing collar projecting from the first sealing surface to encircle a corresponding sealing aperture for forming a fluid tight seal between each adjacent inner duct and inner duct coupler; and,
 (d) at least one spacer contacting an innerduct for maintaining the inner ducts in mutual parallel relation within the outer housing, whereby the fluid tight seal is formed between a first and a second conduit section upon insertion of the first section inner ducts into the second section inner duct coupler and insertion of the first section straight end into the second section belled end 2. The integral conduit section of claim 1 wherein the seating component flange comprises a perimetal collar for telescopically receiving the seal and the guide component flange, the perimetal collar sized to seat in a neck portion of the outer housing adjacent the first and the second portion of the outer housing.

3. The integral conduit section of claim 1 wherein the guide tube projects from the flange to terminate substantially coplanar with the belled end.

4. The integral conduit section of claim 1 wherein the seating robe has a radial, inwardly depending, seating collar having a first surface for contacting a first adjacent inner duct and a second surface for contacting a second adjacent inner duct.

5. The integral conduit section of claim 4 wherein the seating collar has a radial thickness substantially equal to the wall thickness of the inner ducts.

6. The integral conduit section of claim 1 wherein the seating tube has a flared inner diametral surface adjacent the sealing surface.

7. The integral conduit section of claim 1 wherein the inner duct extends through a plane including the straight end.

8. The integral conduit section of claim 1 wherein a terminal end of the inner duct is chamfered.

9. The integral conduit section of claim 1 wherein the seal comprises at least one positioning collar projecting from the second sealing surface and concentric with a sealing aperture,
wherein the positioning collar is sized to seat in the annular recess.

10. The integral conduit section of claim 9, wherein the positioning collar has a flared inner diametral surface distal to the second sealing surface.

11. The integral conduit section of claim 1 wherein the sealing collar includes a radially inward projecting deformable lip having an inner diameter that is less than the outer diameter of the inner ducts.

12. The integral conduit section of claim 1 wherein the spacer is a disc having a perimeter and at least one U-shaped aperture open along the perimeter, the U-shaped aperture including an inwardly projecting gripper ridge for contacting an inner duct, and the perimeter including a projecting ridge for contacting the outer housing.

13. The integral conduit section of claim 1 wherein the seal comprises a glass reinforced polyethylene resin.

14. A duct coupler for forming a fluid tight connection between adjacent cylindrical cable ducts, comprising:
(a) a seating component including a first flange having a first sealing surface and at least one seating tube extending from the flange in a first direction for receiving one end of a first cable duct for permanent fluid tight connection thereto;
(b) a guide component including a second flange having a second sealing surface and at least one guide tube extending from the second flange in an opposite direction for slidably and removably receiving an end of a second cable duct therethrough; and
(c) a seal having a sealing disk portion for forming a fluid tight seal to the first seating component sealing surface and the second guide component sealing surface, at least one sealing aperture for receiving a cable duct therethrough, and a duct seal in the aperture for forming a fluid tight seal to the duct.

15. The duct coupler of claim 14, wherein the seating component flange has a perimetal collar for telescopically receiving the guide component flange and the seal.

16. The duct coupler of claim 14, wherein the guide tube has an inner diametral surface that flange surface but short of the sealing surface,
includes an annular recess.

17. The duct coupler of claim 14, wherein the seal includes at least one positioning collar projecting from a first sealing surface of the sealing disk portion and concentric with a sealing aperture.

18. The duct coupler of claim 17, wherein the positioning collar has a flared inner diametral surface.

19. The duct coupler of claim 14, wherein the duct seal includes at least one sealing collar concentric with a sealing aperture, the sealing collar having a radially, inwardly depending, deformable lip having an inner diameter that is smaller than the diameter of the sealing aperture.

20. The duct coupler of claim 14, wherein the sealing disk portion has an alignment aperture for receiving the alignment pin upon assembly of the duct coupler.

21. The duct coupler for forming a fluid tight connection between adjacent cylindrical cable ducts, comprising:
(a) a seating component including a flange having a sealing surface and at least one seating tube extending from the flange for receiving one end of a cable duct for permanent fluid tight connection thereto; and including a radially inwardly depending seating collar for terminally positioning the cable ducts;
(b) a guide component including a flange having a sealing surface and at least one guide tube extending from the flange for slidably and removably receiving an end of a cable duct therethrough; and
(c) a seal having a sealing disk portion for forming a fluid tight seal to the seating component sealing surface and the guide component sealing surface, at least one sealing aperture for receiving a cable duct therethrough, and a duct seal in the aperture for forming a fluid tight seal to the duct.

22. A duct coupler of claim 21, wherein the seating tube collar is located intermediate the ends of the guide tube.

23. A duct coupler for forming a fluid tight connection between adjacent cylindrical cable ducts, comprising:
(a) a seating component including a flange having a sealing surface and at least one seating tube extending from the flange for receiving one end of a cable duct for permanent fluid tight connection thereto;
(b) a guide component including a flange having a sealing surface and at least one guide tube extending from the flange for slidably and removably receiving an end of a second cable duct therethrough; and
(c) a seal having a sealing disk portion for forming a fluid tight seal to the seating component sealing surface and the guide component sealing surface, at least one sealing aperture for receiving a cable duct therethrough, and a duct seal in the aperture for forming a fluid tight seal to the duct; and the seating component sealing surface including an alignment pin for colinearly aligning the seating tube, the guide tube, and the sealing aperture upon assembly of the duct coupler.

24. The duct coupler of claim 23, wherein the guide component flange has an alignment aperture for receiving the alignment pin.

25. A duct coupler for forming a fluid tight connection between adjacent cylindrical cable ducts, comprising:

(a) a seating component including a first flange having a first sealing surface and at least one seating tube extending from the flange in a first direction for receiving one end of a first cable duct for permanent fluid tight connection thereto;

(b) a guide component including a second flange having a second sealing surface and at least one guide tube extending from the second flange in an opposite direction for slidably and removably receiving an end of a second cable duct therethrough; and (c) a seal having a sealing disk portion for forming a fluid tight seal to the first and second seating component sealing surface and the guide component sealing surface, at least one sealing aperture for receiving a cable duct therethrough, and a duct seal in the aperture for forming a fluid tight seal to the duct;

wherein the seating component guide tube has a flared end so that the flared end intersects the sealing surface.

* * * * *